United States Patent [19]
Duncan

[11] Patent Number: 5,325,814
[45] Date of Patent: Jul. 5, 1994

[54] APPLICATION FOR BIOLOGICALLY ACTIVE SUBSTANCE

[75] Inventor: Ian M. Duncan, Zimbabwe, South Africa

[73] Assignee: Agricura (Private) Limited, Zimbabwe, South Africa

[21] Appl. No.: 28,797

[22] Filed: Mar. 9, 1993

[30] Foreign Application Priority Data

Mar. 16, 1992 [ZM] Zambia ................................. 37/92

[51] Int. Cl.⁵ ............................................ A01K 29/00
[52] U.S. Cl. ................................................. 119/157
[58] Field of Search ............... 119/156, 157, 158, 159, 119/160, 29.5, 29

[56] References Cited

U.S. PATENT DOCUMENTS

| | | | |
|---|---|---|---|
| 1,318,159 | 10/1919 | Leeper | 119/157 |
| 1,390,611 | 9/1921 | Haisley | 119/157 |
| 2,438,731 | 3/1948 | Wedeking | 119/157 |
| 2,894,487 | 7/1959 | Goldson | 119/29.5 |
| 2,964,011 | 12/1960 | Hall | 119/157 |
| 3,870,023 | 3/1975 | Wilson | 119/159 |

*Primary Examiner*—Price Thomas
*Attorney, Agent, or Firm*—Davis, Bujold & Streck

[57] ABSTRACT

The invention provides a device adapted to apply a chemical to an animal requiring treatment with that chemical. In particular the device applies a parasiticide such as "Pouron" to the animal which is attracted to the device by feed or a lick in a container associated with the device, the device being activated by movement thereof resulting from contact with the animal or wind.

9 Claims, 1 Drawing Sheet

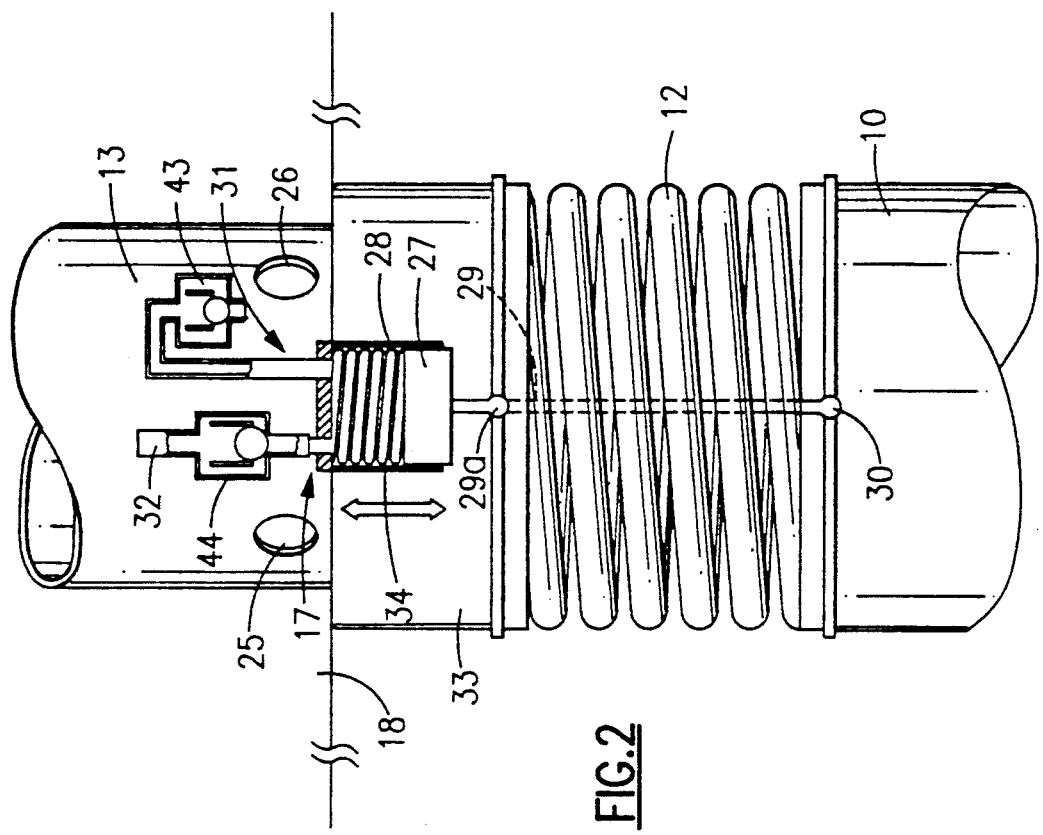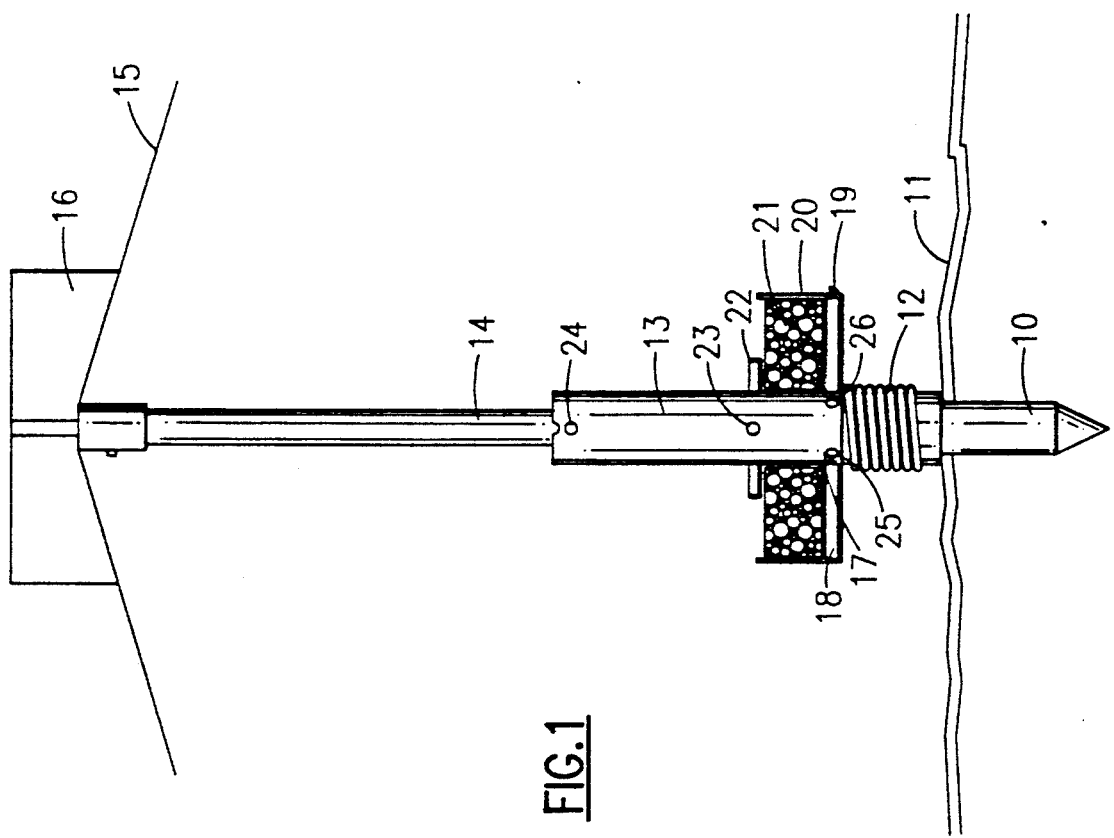

APPLICATION FOR BIOLOGICALLY ACTIVE SUBSTANCE

BACKGROUND OF THE INVENTION

This invention relates to devices for the application of a biologically active substance to animals.

The traditional approach to reducing vermin infestation of animals has been total immersion of the animal in a "dip" containing a suitable chemical adapted to destroy a particular pest, for example, ticks, fleas, mites.

When large numbers of animals are to be handled this method presents a considerable workload, even when handling domestic animals such as cattle or sheep.

The problem is considerably compounded when handling of non-domesticated animals such as "game" is attempted.

However, as a result of development of chemicals having the ability to spread over the entire skin surface of animals to which the chemical is applied in a single application, for example along the animal's spine, there is a need for a suitable applicator for these chemicals which would at last minimize the disadvantages of known methods, particularly when treating wild or game animals.

SUMMARY OF THE INVENTION

According to the invention, an applicator for a biologically active substance comprising an anchor to anchor the applicator in a given location; a substance dispensing system, resiliently and pivotally supported by the anchor, reservoir for containing a biologically active substance, a dispensing element, means for conveying the substance from the reservoir to the dispensing element, a catchment zone downstream of the dispensing element to receive, for recycle purposes, surplus biologically active substance from the dispensing element; and a lure holder adapted to hold a lure to attract animals into contact with the dispensing element.

The dispensing element is preferably an applicator for a biologically active substance comprising an anchor to anchor the applicator in a given location; a substance dispensing system, resiliently and pivotally supported by the anchor, reservoir for having a biologically active substance, a dispensing element, means for conveying the substance from the reservoir to the dispensing element, a catchment zone downstream of the dispensing element to receive, for recycle purposes, surplus biologically active substance from the dispensing element; and a lure holder adapted to hold a lure to attract animals into contact with the dispensing element.

An applicator as claimed in claim 2 wherein the conveying means comprises a pump adapted to be operated by movements of the applicator about the pivotal support.

An applicator as claimed in claim 3 wherein the pump comprises a piston and cylinder assembly, the cylinder being fast with a lower zone of the dispensing element and the piston being connected by a connecting rod with the anchor; the arrangement being such that upon movement of the dispensing system from the substantially vertical plane the connecting rod will move the piston within its cylinder thus providing a pumping action which withdraws biologically active substance from the reservoir and conveys it to the outlet of the dispensing element.

An applicator as claimed in claim 7 wherein the canopy is provided with at least one vane to increase movement of the applicator due to wind forces impinging on the applicator.

BRIEF DESCRIPTION OF THE DRAWINGS

The invention will now be described, by way of example, with reference to the accompanying drawings, in which:

FIG. 1 is a part sectioned schematic of one form of the applicator of the present invention; and FIG. 2 is a part sectioned schematic of one form of pump for recycling biologically active substance in the applicator shown in FIG. 1.

Referring to FIG. 1, an anchor 10 in the form of a spike is capable of being driven into the ground 11 to locate the applicator in a given environment. A pivot 12 connects the anchor and a dispensing element 13 to permit element 13 to move in response to contact with an animal (not shown) or, via extension rod 14, a canopy 15 and/or wind vanes 16, in response to weather conditions and more particularly to wind.

Associated with the lower zone 17 of the dispensing element 13 is a reservoir 18 for biologically active substance. Reservoir 18 has a filler plug 19. A trough 20 lies above reservoir 18 and contains a lure 21 to attract animals to the applicator. Suitably positioned at 22 is a catchment trough which mates with opening 23 for biologically active substance which has drained down the surface of dispensing element 13 from supply port 24 to return that substance back to reservoir 18 via an internal conduit (not shown) in the lower zone 17 of dispensing element 13 via holes 25 and 26 in the reservoir 18.

Referring now to FIG. 2, a piston 27 and mating cylinder 28 are located in pump housing 33 which is fast with lower zone 17 of dispensing element 13. The piston 27 is coupled, by connecting rod 29, to point 30 on anchor 10 via a connecting rod pivot 29 (*a*).

Cylinder 28 is provided with an inlet port 31 for receiving biologically active substance from reservoir 18 and an outlet conduit 32 which leads to supply port 24 (FIG. 1) on dispensing element 13.

The inlet port 31 incorporates a one-way ball valve 43 permitting inlet to the pump only during its suction stroke and the outlet incorporates a one-way ball valve 44 permitting outlet from the pump only during its compression stroke.

In this example, the applicator pivot 12 is a coiled spring interconnecting the anchor 10 and the base zone 17 of dispensing element 13 via pump housing 33. A spring 34 is located within cylinder 28 between the cylinder 28 and piston 27 to exert a positive pressure on piston 27.

In use, in the field, (particularly when concerned with the treatment of wild animals or game), the applicator is set up at a suitable location, for example near a waterhole, and reservoir 18 is charged with diluted biologically active substance solution such as that sold commercially and known under the trade name "Pouron" (Bayer AG).

A suitable lure 21 such as a cattle lick or a food stuff is loaded into trough 20 and the apparatus is ready for use. Game attracted to the lure 21 will rub against dispensing element 13 during licking or feeding thereby rocking element relative to the anchor and moving piston 27 within cylinder 28 via connection rod 29 thereby drawing biologically active substance into inlet port 31 through valve 43 and discharging it under pressure via valve 34, conduit 32 and port 24 on dispensing element 13 where a quantity of biologically active substance will be spread upon the animal's coat usually in the vicinity of the head or neck of the animal from whence, by its very nature, it spreads over the entire skin surface of the animal, usually within approximately 24 hours from contact. The biologically active substance may be activated only when treatment by contact is required. Alternatively, the device may be in a permanent state of readiness where there is a mild wind blowing which will cause the device to move about anchor point 10 and pivot 12 thereby causing a constant flow of biologically active substance along the outer surface of dispensing element 13.

It will be appreciated by those skilled in the art that the applicator is an invention which fulfills a long felt want and an effective solution to what has been a vexing problem in reducing vermin infestation in animals of all kinds, but more particularly in respect of non-domesticated animals in view of the increasing prominence of game farming in various parts of the world.

I claim:

1. A vertical applicator for a biologically active substance comprising:
   an anchor for anchoring the applicator at a desired location;
   a substance dispensing system, resiliently and pivotally supported by the anchor, comprising a reservoir for containing a biologically active substance, a dispensing element for dispensing the substance to an outlet, means for interconnecting and for conveying the substance from the reservoir to an inlet of the dispensing element, a catchment zone, located adjacent and below the outlet of the dispensing element, for receiving surplus substance dispensed by the dispensing element, and means interconnecting the catchment zone with the reservoir for recycling the surplus substance from the catchment zone to the reservoir; and
   a lure holder for holding a lure to attract an animal into contact with the dispensing element.

2. An applicator according to claim 1 wherein the dispensing element is an elongate substantially upright generally tubular element which has, at an upper portion thereof, the outlet for supplying the substance from the interconnecting and conveying means to an exterior surface of the tubular element, and
   the tubular element has, at a lower portion thereof, an inlet to said means for recycling the substance from the catchment zone to the reservoir.

3. An applicator according to claim 2 wherein the interconnecting and conveying means includes a pump operated by movement of the substance dispensing system relative to the anchor about the resilient and pivotal support.

4. An applicator according to claim 3 wherein the pump comprises a piston and a cylinder, the cylinder is fast with a lower portion of the dispensing element and the piston is connected by a connecting rod with the anchor such that, upon movement of the dispensing system from a substantially vertical plane, the connecting rod moves the piston within the cylinder thereby providing a pumping action which withdraws the substance from the reservoir and conveys the substance to the outlet of the dispensing element.

5. An applicator according to claim 4 wherein the applicator includes means for creating movement of the dispensing element.

6. An applicator according to claim 4 wherein the applicator includes means for interacting with wind to generate movement of the dispensing element.

7. An applicator according to claim 1 wherein an upper portion of the dispensing element is provided with a substantially horizontally disposed canopy which acts as a weather shield.

8. A vertical applicator for a biologically active substance comprising:
   an anchor for anchoring the applicator at a desired location;
   a substance dispensing system, resiliently and pivotally supported by the anchor, comprising a reservoir for containing a biologically active substance, a dispensing element for dispensing the substance to an outlet, means for interconnecting and for conveying the substance from the reservoir to an inlet of the dispensing element, a catchment zone, located adjacent the outlet of the dispensing element, for receiving surplus substance dispensed by the dispensing element, and conduit means interconnecting the catchment zone with the reservoir for recycling the surplus substance from the catchment zone to the reservoir; and
   a lure holder for holding a lure to attract an animal into contact with the dispensing element;
   wherein an upper part of the dispensing element is provided with a substantially horizontally disposed weather shield canopy, and the canopy is provided with at least one vane to increase movement of the dispensing element due to a wind force impinging on the canopy.

9. A vertical applicator for a biologically active substance comprising:
   an anchor for anchoring the applicator at a desired location;
   a substance dispensing system, pivotally supported by the anchor, comprising a reservoir for containing a biologically active substance, a dispensing element for dispensing the substance to an outlet, pump means interconnecting the reservoir with an inlet of the dispensing element for conveying the substance from the reservoir to an inlet of the dispensing element, an annular catchment member, located adjacent and below the outlet of the dispensing element, for receiving surplus substance dispensed by the dispensing element, and a conduit interconnecting the catchment member with the reservoir for recycling the surplus substance from the catchment member to the reservoir; and
   a lure for attracting an animal into contact with the dispensing element.

* * * * *